United States Patent [19]

Bonga

[11] 4,319,115

[45] Mar. 9, 1982

[54] ELECTRODE TOOL HOLDER FOR EDM APPARATUS

[75] Inventor: Benno I. Bonga, Crans, Switzerland

[73] Assignee: Ateliers des Charmilles, Geneva, Switzerland

[21] Appl. No.: 123,995

[22] Filed: Feb. 25, 1980

[30] Foreign Application Priority Data

Mar. 9, 1979 [CH] Switzerland .......................... 2276/79

[51] Int. Cl.³ .............................................. B23P 1/12
[52] U.S. Cl. ................................ 219/69 R; 219/69 E
[58] Field of Search ................. 219/69 R, 69 G, 69 E

[56] References Cited

U.S. PATENT DOCUMENTS

| 3,222,494 | 12/1965 | O'Connor | 219/69 E |
| 3,443,054 | 5/1969 | O'Connor | 219/69 E |
| 4,229,635 | 10/1980 | Dinsdale | 219/69 G |

FOREIGN PATENT DOCUMENTS 1214343 4/1966 Fed. Rep. of Germany .... 219/69 R

*Primary Examiner*—C. C. Shaw
*Attorney, Agent, or Firm*—Hauke and Patalidis

[57] ABSTRACT

An electrode tool holder for an EDM apparatus which can support either an electrode tool of large size or an electrode tool of small size. The EDM apparatus is provided with a ram consisting of two separate, preferably concentric, linearly movable slide members. One of the slide members, linearly displaceable by a servo motor, carries a holder for an electrode tool of small dimension. The second slide member, although normally linearly displaceable relative to the first slide member, is arranged to be coupled to the first slide member for supporting an electrode tool of large dimension, both coupled slide members being thus driven by the same servo motor.

4 Claims, 2 Drawing Figures

ELECTRODE TOOL HOLDER FOR EDM APPARATUS

BACKGROUND OF THE INVENTION

The present invention relates to EDM apparatus for machining by electrical discharges an electrode workpiece by means of an electrode tool, the EDM apparatus being provided with an electrode tool holder driven by a servo motor for displacing the electrode tool as a function of the machining conditions.

In the course of machining workpieces of large dimensions, the machining of small scale details on the workpiece presents some problems which are difficult to solve, more particularly at the beginning of a machining operation when a rough pass is effected on the workpiece.

A solution consists in replacing the large dimension electrode tool by an electrode tool of smaller dimension capable of machining small details on the workpiece, following the first rough machining pass on the workpiece. However, such a method is not completely satisfactory, because the high mass inertia of the moving parts driven by the servo motor, resulting from the tool holder of large size required for supporting an electrode tool of large dimensions, reduces considerably the dynamic performance of the system, thus considerably decreasing the machining efficiency.

SUMMARY OF THE INVENTION

The present invention has for its principal object to eliminate the above-mentioned inconveniences by providing an EDM apparatus having, for example, a pair of electrode tool holders mounted on the end of separate ram members, or slide members, each arranged to support an electrode tool of different dimension and weight or mass, and provided with means for interconnecting and disconnecting the slide members, as desired, the servo motor output driving one of the slide members, such as the smaller of the slide members, the larger slide member being held inoperative when only the smaller electrode tool is used.

By means of such an electrode tool holder structure, an electrode of small size may be used for machining small detailed areas on the workpiece when coupled to the output of the servo motor through an assembly of small mass inertia, which provides a considerable improvement on the quality and the speed of machining.

BRIEF DESCRIPTION OF THE DRAWINGS

In the accompanying drawing, which illustrates schematically, and by way of example, an EDM apparatus workhead structure according to the present invention.

DETAILED DESCRIPTION OF THE PREFERRED EMBODIMENT

Figure 1:
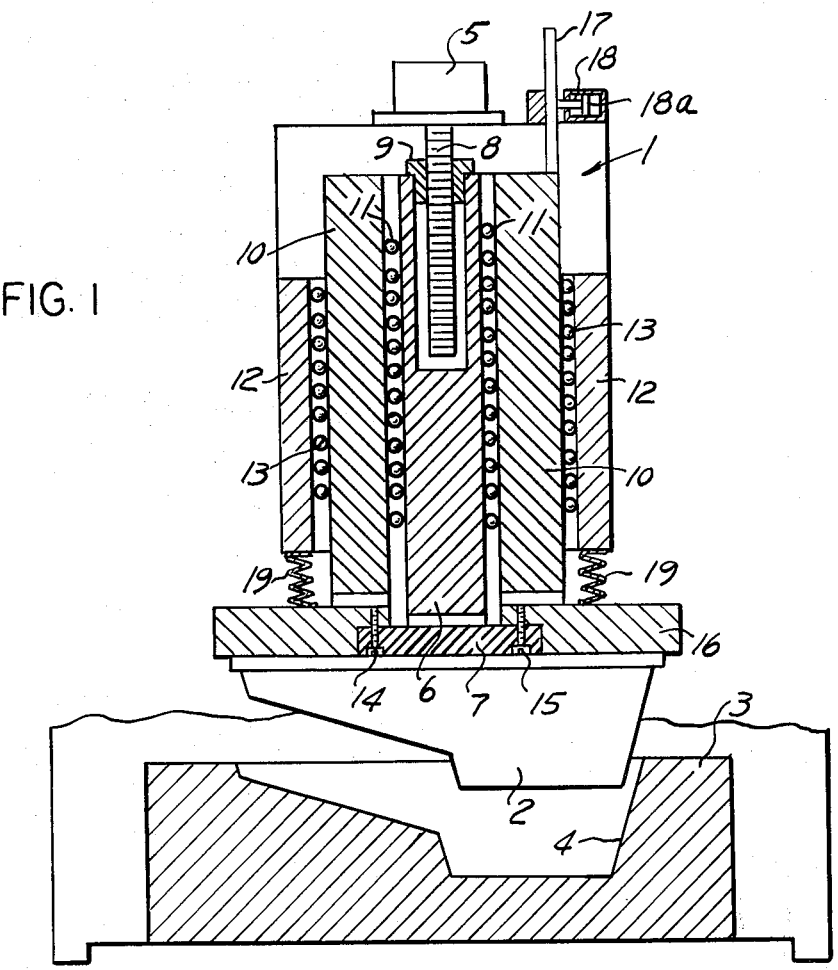
FIG. 1 is a partial section through the workhead assembly supporting an electrode tool of large dimensions.

Referring to the drawing, and more particularly to FIG. 1, there is illustrated an example of structure, according to the present invention, for an EDM apparatus workhead, or ram, assembly 1 linearly displacing an electrode tool 2 relative to an electrode workpiece 3, such as to sink in the electrode workpiece a cavity 4 which is substantially a mirror image of the electrode tool 2.

The workhead assembly 1 comprises a servo motor 5, which is controlled in a manner well known in the EDM art by a servo control, not shown, such as to maintain predetermined electrical discharge machining conditions in the machining zone between the electrode tool 2 and the electrode workpiece 3. A first linearly movable ram portion, or slide member 6, on the end of which is mounted an electrode tool holder 7, is longitudinally displaceable by the servo motor 5 having a rotatably driven output shaft provided with a threaded end portion 8 threading through a drive nut 9 affixed to the end of the first slide member 6.

The slide member 6 is linearly displaceable within a tubular second slide member 10, being supported and guided relatively thereto by linear ball bearings 11. The tubular slide member 10 is linearly movable relative to the housing 12 of the workhead 1, being guided and supported relatively thereto by way of linear ball bearings 13, and supports an electrode tool holder 16 mounted on its lower end.

The first, or inner, linearly movable slide member 6 can be coupled to the tubular slide member 10 by means of bolts or screws 14 and 15 interconnecting the electrode tool holders 7 and 16, such that when the two slide members are coupled they are linearly displaceable in unison by the servo motor 5 and they are adapted to support the large dimension electrode tool 2 mounted on the large dimension electrode tool holder 16 mounted on the end of the tubular slide member 10.

The electrode tool holder 16 mounted on the end of the tubular slide member 10 can be held in any appropriate position, when disconnected from the electrode tool holder 7, by means of a rod 17 affixed to the upper end of the tubular slide member 10 which can be immobilized by being clamped by the end of a rod 18 driven, for example, by a fluid actuated piston 18a. A bellows 19 prevents the introduction of dirt and dust into the bearings of the slide members of the workhead 1.

Figure 2:
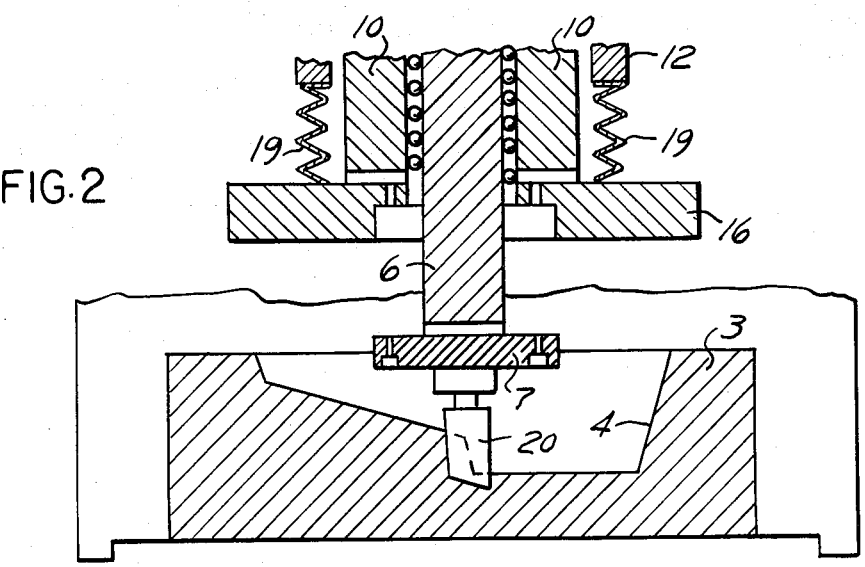
FIG. 2 is a partial section of the lower portion of the assembly when supporting an electrode tool of small dimensions.

After the cavity 4 has been sunk in the electrode workpiece 3 by means of the large dimension electrode tool 2, surface details may be machined in the cavity by means of a second, smaller, electrode tool 20 mounted on the small electrode tool holder 7, FIG. 2, on the end of the inner slide member 6 driven by the servo motor 5. The coupling bolts or screws 14 or 15 are removed and the tubular slide member 10 is held stationary by means of the piston rod 18 in clamping engagement with the rod 17.

The structure of the invention also permits to dispose between the electrode tool 20 and the electrode tool holder 7 or, alternatively, between the electrode tool 2 and its holder 16, an auxiliary mechanism providing displacement of the corresponding electrode tool in a direction perpendicular to the axis of feed of the electrode tool into the workpiece 3.

It will be appreciated by those skilled in the art that instead of drivingly coupling the servo motor 5 to the inner slide member 6, the servo motor 5 can be coupled to the tubular slide member 10 or that, in the alternative, the servo motor could be drivingly coupled to one or the other of the slide members, means being provided for immobilizing the slide member which is desired to be held stationary.

Having thus described the present invention by way of an example of structural embodiment thereof, given for illustrative purpose only, modifications whereof will be apparent to those skilled in the art, what is claimed as new is as follows:

1. In an EDM apparatus for machining by electrical discharges an electrode workpiece by means of an electrode tool, said EDM apparatus comprising an electrode tool holder and a single servo motor displacing said electrode tool holder as a function of machining conditions, the improvement comprising at least a pair of separate slide members, a separate electrode tool holder mounted on each of said slide members, means permanently coupling one of said slide members to said servo motor and driving said one of said slide members by said servo motor, means for mutually coupling and uncoupling said slide members, and means immobilizing the one of said slide members not driven by said servo motor when said slide members are uncoupled.

2. The improvement of claim 1 wherein said means coupling and uncoupling said slide members comprise removable connection means between said electrode tool holders.

3. The improvement of claim 1 wherein said slide members are of different dimensions, one of said slide members is mounted coaxially telescopic within the other, and the smaller of said slide members is the slide member permanently coupled to said servo motor.

4. The improvement of claim 3 wherein said means immobilizing one of said slide members immobilizes the larger one of said slide members in a predetermined position when said slide members are uncoupled.

* * * * *